(12) United States Patent
Lee

(10) Patent No.: US 7,679,008 B2
(45) Date of Patent: Mar. 16, 2010

(54) PORTABLE STORAGE DEVICE WITH MULTIPLE DATA INTERFACES

(75) Inventor: Chuan-Yuan Lee, Taipei (TW)

(73) Assignee: Compal Electronics, Inc., Taipei (TW)

( * ) Notice: Subject to any disclaimer, the term of this patent is extended or adjusted under 35 U.S.C. 154(b) by 1282 days.

(21) Appl. No.: 11/177,343

(22) Filed: Jul. 11, 2005

(65) Prior Publication Data

US 2006/0083158 A1  Apr. 20, 2006

(30) Foreign Application Priority Data

Oct. 8, 2004  (TW) ................. 93130571 A

(51) Int. Cl.
*H01R 13/502* (2006.01)

(52) U.S. Cl. ............ 174/560; 174/521; 439/131; 361/737

(58) Field of Classification Search ............ 174/520, 174/560; 439/131; 361/752, 737
See application file for complete search history.

(56) References Cited

U.S. PATENT DOCUMENTS

| | | | |
|---|---|---|---|
| 6,567,273 B1 * | 5/2003 | Liu et al. ............ | 361/737 |
| 6,650,534 B2 * | 11/2003 | Tree ............ | 361/679.4 |
| 6,671,808 B1 * | 12/2003 | Abbott et al. ............ | 726/4 |
| 6,763,410 B2 * | 7/2004 | Yu ............ | 710/74 |
| 6,908,038 B1 * | 6/2005 | Le ............ | 235/492 |
| 7,121,850 B2 * | 10/2006 | Yeh ............ | 439/131 |
| 2005/0037647 A1 * | 2/2005 | Le ............ | 439/131 |
| 2006/0028803 A1 * | 2/2006 | Pocrass ............ | 361/737 |
| 2006/0052001 A1 * | 3/2006 | Parker ............ | 439/358 |

FOREIGN PATENT DOCUMENTS

TW  587854  5/2004

* cited by examiner

*Primary Examiner*—Hung V Ngo
(74) *Attorney, Agent, or Firm*—Muncy, Geissler, Olds & Lowe, PLLC

(57) ABSTRACT

The present invention relates to a portable storage device with multiple data interfaces coupled to an electronic device for performing data access. The portable storage device has a casing, a circuit board, a first data interface and a second data interface. The casing contains a cavity, and a first opening and a second opening are located in both sides thereof. The circuit board is placed inside the cavity and contains a memory for performing data access. One terminals of the first data interface and the second data interface are electrically connected to both sides of the circuit board, respectively. The other terminals of the first data interface and the second data interface protrude out of the casing via the first opening and the second opening, respectively, to be coupled to an electronic device for performing data access.

10 Claims, 7 Drawing Sheets

PORTABLE STORAGE DEVICE WITH MULTIPLE DATA INTERFACES

RELATED APPLICATIONS

The present application is based on, and claims priority from, Taiwan Application Serial Number 93130571, filed Oct. 8, 2004, the disclosure of which is hereby incorporated by reference herein in its entirety.

FIELD OF THE INVENTION

The present invention relates to a portable storage device, and more particularly to a portable storage device with multiple data interfaces.

BACKGROUND OF THE INVENTION

Recently, with the increasing demands for portable storage devices, portable storage devices have gradually changed from small-capacity disks to large-capacity portable storage devices. The current large-capacity portable storage device not only is lightweight and small, but also has an exposed data interface, such as a universal serial bus (USB) interface, a mini-USB interface or an IEEE 1394 interface. A user only needs to connect the portable storage device to an electronic device via the exposed data interface for conveniently performing data access and exchange between the portable storage device and the electronic device.

FIG. 1A and FIG. 1B are schematic 3-D and cross-sectional views showing a conventional portable storage device. The conventional portable storage device 100 generally includes a casing 110, a circuit board 120 and a data interface 130. The circuit board 120 is placed inside the casing 110 to prevent the circuit board 120 from being damaged by external touch. The circuit board 120 contains a memory device for storing data and requires related circuit layouts (not shown). The data interface 130 is electrically connected to the circuit board 120, and can be coupled to an electronic device (not shown), so as to perform data transmission and exchange between the portable storage device 100 and the electronic device via the data interface 130.

However, the current portable storage device only has a single type of data interface, such as a USB interface, or another interface, such as a mini USB interface or an IEEE 1394 interface. If an electronic device does not equip with the data interface matching the data interface of the portable storage device, no data transmission or access can be performed between the portable storage device and the electronic device, unless the user uses a data interface adapter, thus causing a lot of inconvenience for the user.

Besides, all the data interfaces in the aforementioned portable storage devices are exposed by the casing. For preventing the data interface from being damaged by impact, a cap is generally mounted on the outside surface of the data interface element for protection.

SUMMARY OF THE INVENTION

One aspect of the present invention is to provide a portable storage device with multiple data interfaces to connect to electronic devices, thereby performing data access conveniently.

The other aspect of the present invention is to provide a portable storage device with multiple data interfaces and a movement unit exposing or concealing the data interface, thereby not only protecting the data interface from damage, but also briefly switching between different data interfaces.

To achieve the aforementioned aspects, the present invention provides a portable storage device with multiple data interfaces coupled to an electronic device for performing data access. The portable storage device includes a casing, a circuit board, a first data interface and a second data interface. The casing contains a cavity, and a first opening and a second opening located on both sides thereof. The circuit board is placed inside the cavity and contains a memory device for performing data access. One terminal of the first data interface is electrically connected to the circuit board and the other terminal of the first data interface protrudes out of the casing via the first opening to be coupled to the electronic device for performing data access. One terminal of the second data interface is electrically connected to the circuit board and the other terminal of the second data interface protrudes out of the casing via the second opening to be coupled to the electronic device for performing data access.

According to the other aspect of the present invention, a portable storage device with multiple data interfaces and a movement unit coupled to an electronic device is provided for performing data access. The portable storage device includes a casing, a circuit board, a first data interface, a second data interface and a movement unit. The casing contains a cavity, and a first opening and a second opening are located on both sides thereof. The circuit board is placed inside the cavity and contains a memory device for performing data access. One terminal of the first data interface is electrically connected to the circuit board and the other terminal of the first data interface protrudes out of the casing via the first opening so as to be coupled to the electronic device for performing data access. One terminal of the second data interface is electrically connected to the circuit board, and the other terminal of the second data interface protrudes out of the casing via the second opening so as to be coupled to the electronic device for performing data access. The movement unit reciprocates to slide on an axis formed between the first opening and the second opening, thereby enabling the first data interface to protrude out of the casing via the first opening or the second data interface to protrude out of the casing via the second opening.

With the application of the portable storage device of the present invention, a user could choose a proper data interface to connect the portable storage device to the electronic device for performing data access according to the data interface of the electronic device without using an additional adapter. Besides, the portable storage device disclosed in the present invention is equipped with a movement unit, so that the user can choose a desired data interface by pushing the movement unit, thereby not only increasing user convenience but also protecting the data interface.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

With the application of a portable storage device disclosed in the present invention, a user can conveniently connect the portable storage device to electronic devices with different types of data interfaces, without using an additional adapter. Besides, the portable storage device disclosed in the present invention equips with a movement unit used for moving a data interface of the portable storage device, thereby allowing the user to choose conveniently a desired data interface.

Figure 1A:
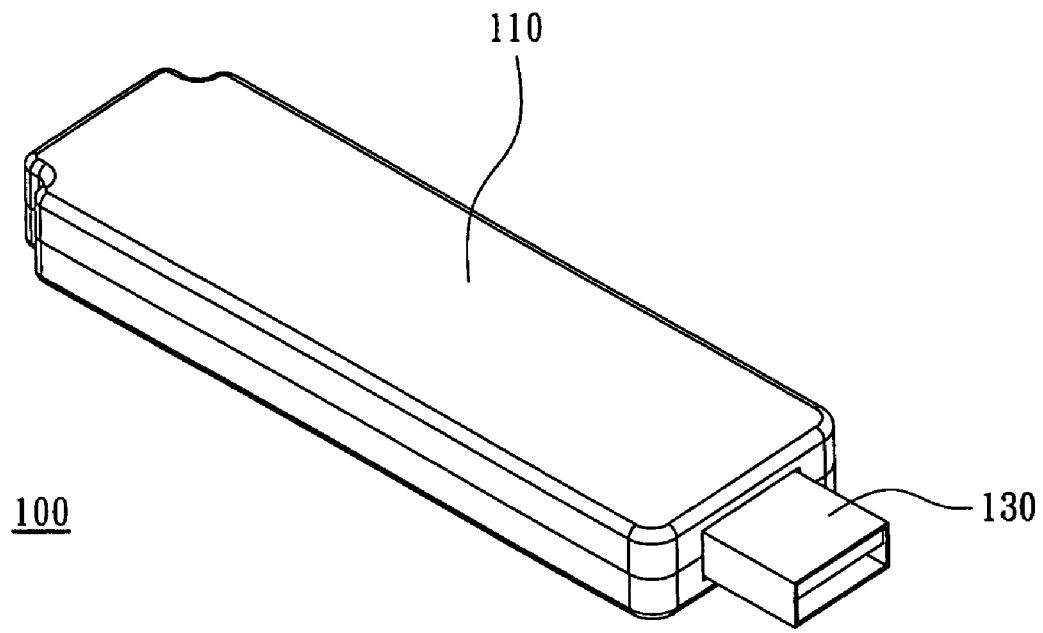
FIG. 1A and FIG. 1B are schematic diagrams respectively showing a 3-D view and a cross-sectional view according to a conventional portable storage device.
Figure 1B:
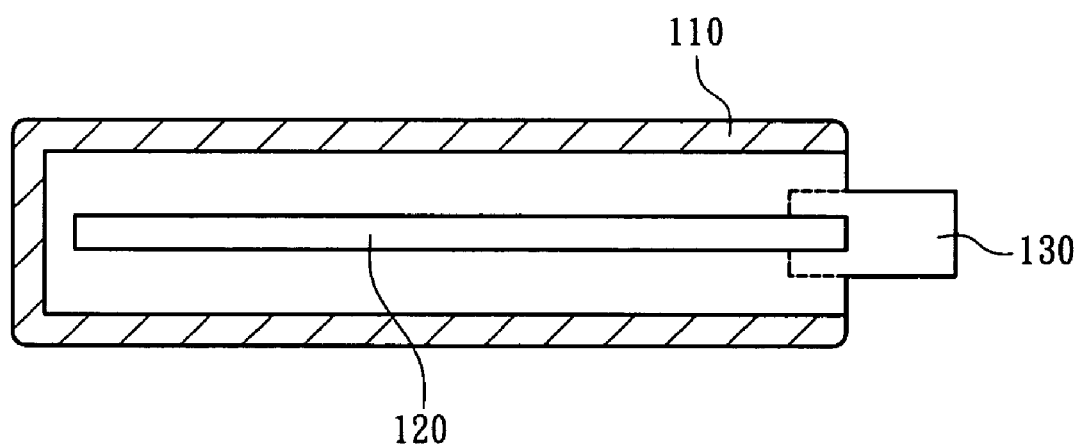
Figure 2A:
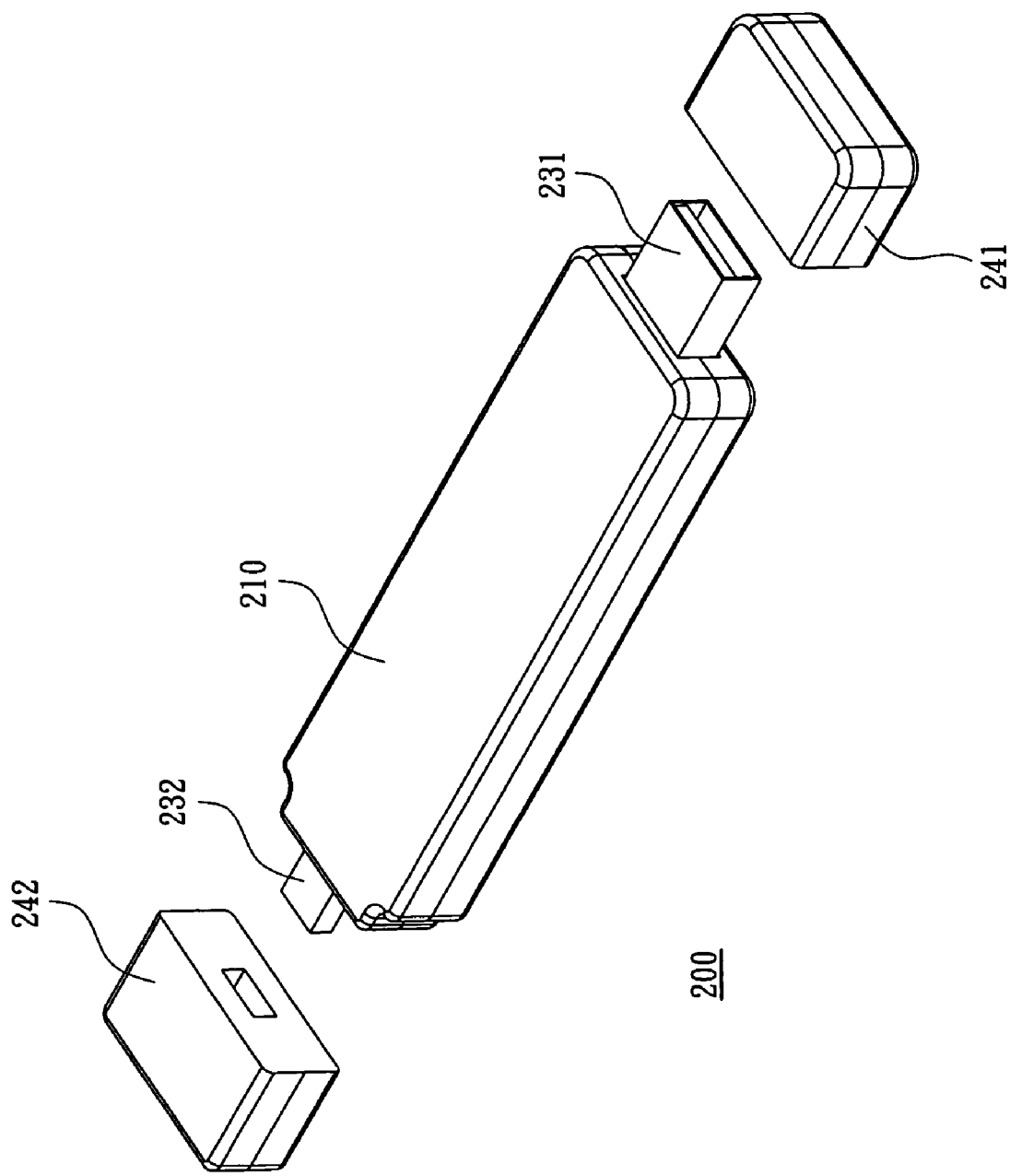
FIG. 2A and FIG. 2B are schematic diagrams respectively showing a 3-D view and a cross-sectional view according to a first preferred embodiment of the present invention.
Figure 2B:
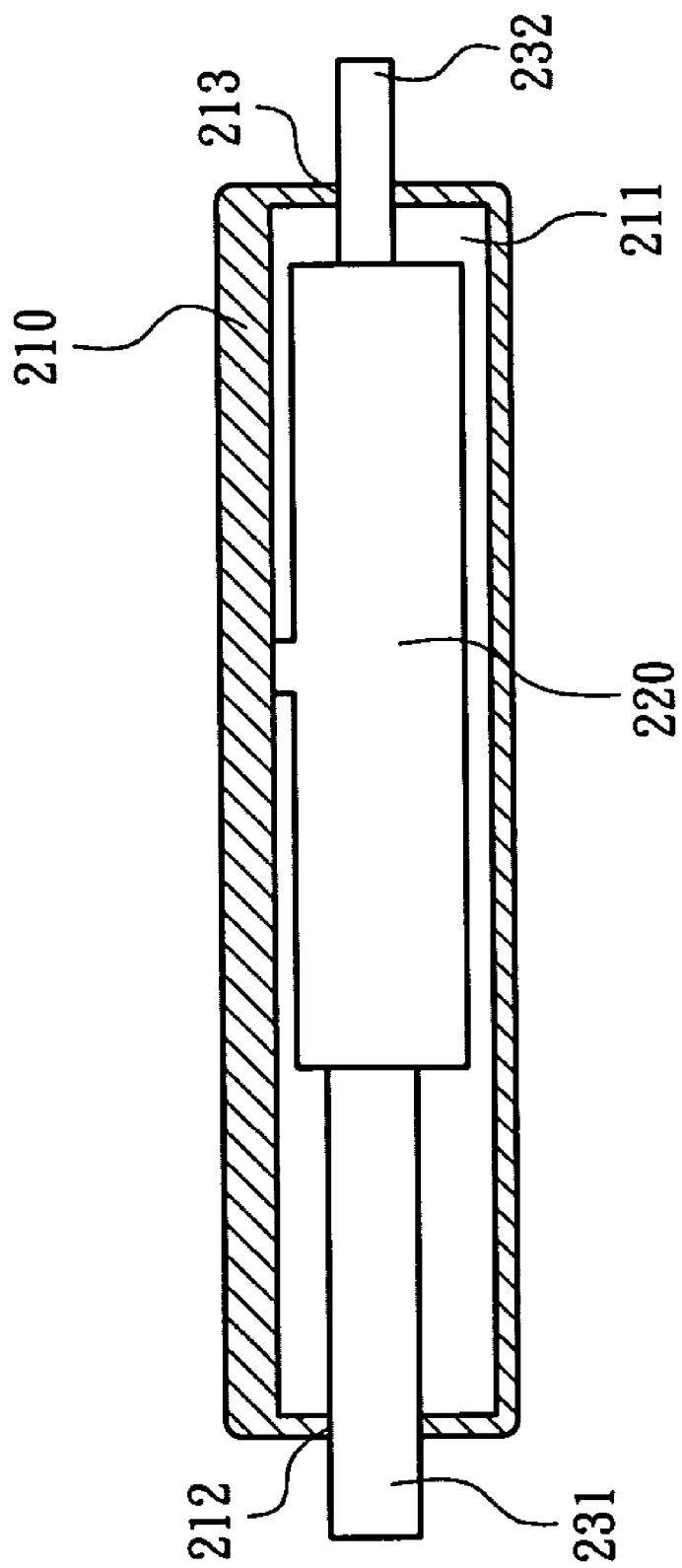

Referring to FIGS. 2A-2B, FIGS. 2A-2B are schematic diagrams respectively showing a 3-D view and a cross-sectional view according to a first preferred embodiment of the present invention. According to the present invention, a portable storage device 200 includes a casing 210, a circuit board 220, a first data interface 231 and a second data interface 232. The portable storage device 200 is, for example, a mobile flash memory (disk) or a storage device with MP3 function. The first data interface 231 and the second data interface 232 are, for example, universal serial bus interfaces, mini universal serial bus interfaces, IEEE 1394 interfaces or PCMCIA interfaces. In the present preferred embodiment, the first data interface 231 is a universal serial bus (USB) interface, and the second data interface 232 is a mini universal serial bus (mini-USB) interface.

The casing 210 contains a cavity 211, a first opening 212 and a second opening 213. The circuit board 220 is placed inside the cavity 211, and contains a memory device used for performing data access. One terminals of the first data interface 231 and the second data interface 232 are electrically connected to both sides of the circuit board 220, respectively. The other terminals of the first data interface 231 and the second data interface 232 protrude out of the casing 210 via the first opening 212 and the second opening 213, respectively, to be coupled to an electronic device (not shown), such as a personal computer, a notebook computer, a personal digital assistant (PDA), a digital camera or a digital video, thereby performing data access. The user can choose the first data interface 231 or the second data interface 232 to connect the portable storage device 200 to the electronic device for performing data transmission or access according to the type of the data interface of the electronic device.

Figure 3:
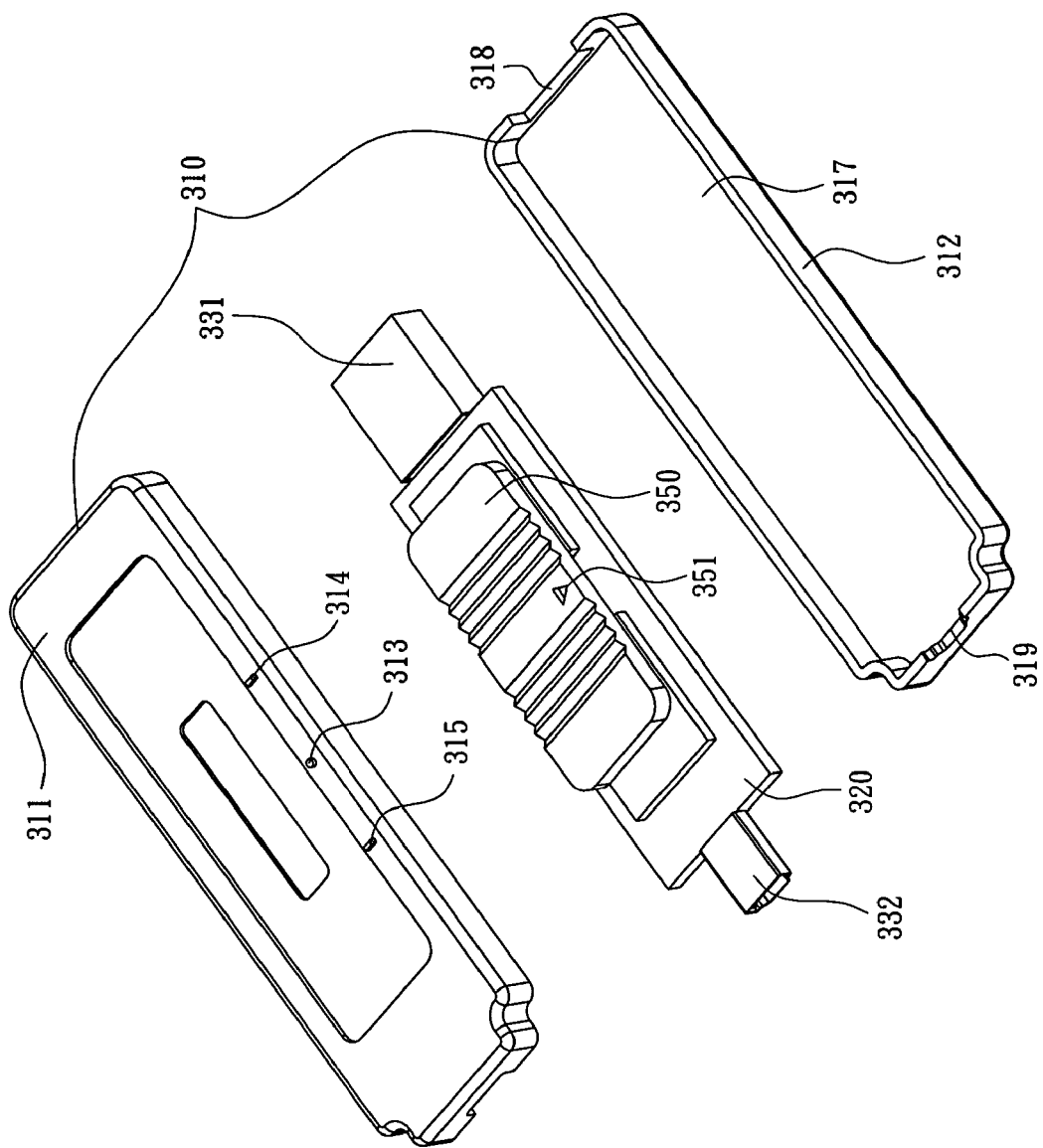
FIG. 3 is a schematic diagram showing an explosive view according to a second preferred embodiment of the present invention.

In addition, a first cap 241 and a second cap 242 respectively cover the first opening 212 and the second opening 213. The first cap 241 and the second cap 242 are used to protect and prevent the first data interface 231 and the second data interface 232 from being damaged by external impact FIG. 3 to FIG. 5C are schematic diagrams according to the second preferred embodiment of the present invention, in which a movement unit is provided to move the multiple data interfaces of the portable storage device. FIG. 3 is a schematic diagram showing an explosive view according to a second preferred embodiment of the present invention. The portable storage device 300 includes a casing 310, a circuit board 320, a first data interface 331, a second data interface 332 and a movement unit 350. The portable storage device 300 is, for example, a mobile flash memory (disk) or a storage device with MP3 function. The first data interface 331 and the second data interface 332 are, for example, universal serial bus (USB) interfaces, mini universal serial bus (mini-USB) interfaces, IEEE 1394 interfaces or PCMCIA interfaces. In the present preferred embodiment, the first data interface 331 is a universal serial bus interface, and the second data interface 332 is a mini universal serial bus interface.

The casing 310 is composed of an upper casing 311 and an under casing 312, and a cavity 317, a first opening 318 and a second opening 319 are formed therein. Besides, the upper casing 311 includes positioning points 313, 314 and 315. The circuit board 320 is placed inside the cavity 317, and contains a memory device used for performing data access. One terminals of the first data interface 331 and the second data interface 332 are electrically connected to both sides of the circuit board 320, respectively, and the other terminals of the first data interface 331 and the second data interface 332 are coupled to the electronic device (not shown), such as a personal computer, a notebook computer, a personal digital assistant, a digital camera or a digital video, thereby performing data access. The movement unit 350 is connected to the top of the circuit board 320 and has a center point 351.

Figure 4A:
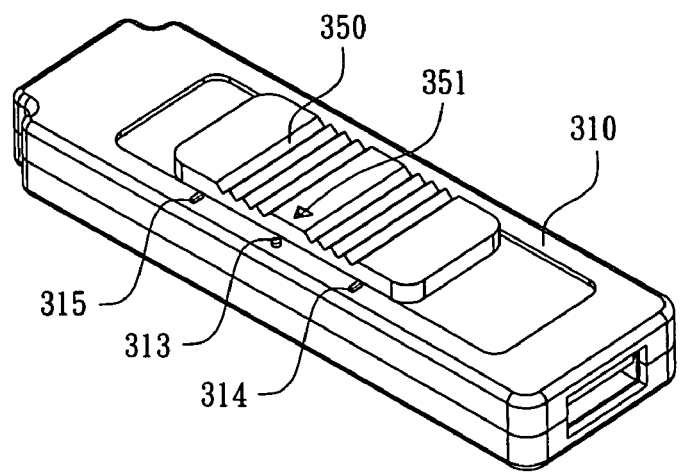
FIGS. 4A-4C are schematic diagrams respectively showing 3-D views according to the second preferred embodiment of the present invention.
Figure 4B:
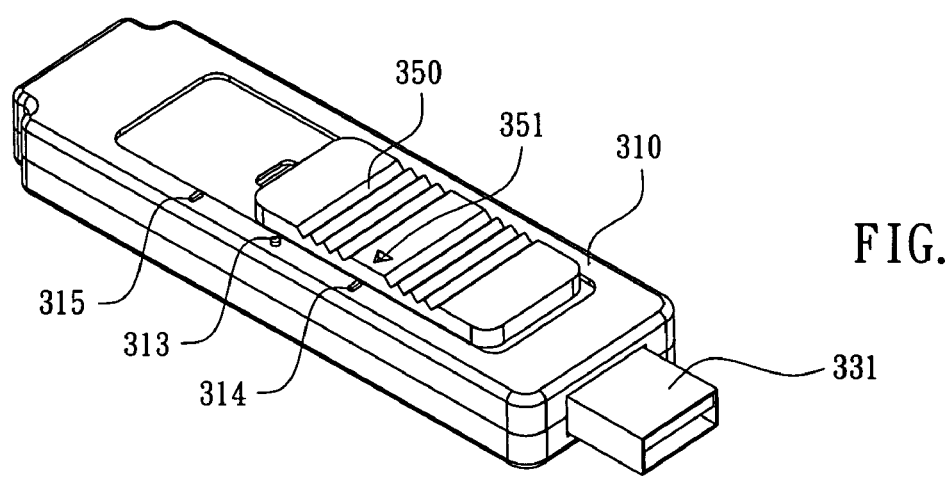
Figure 4C:
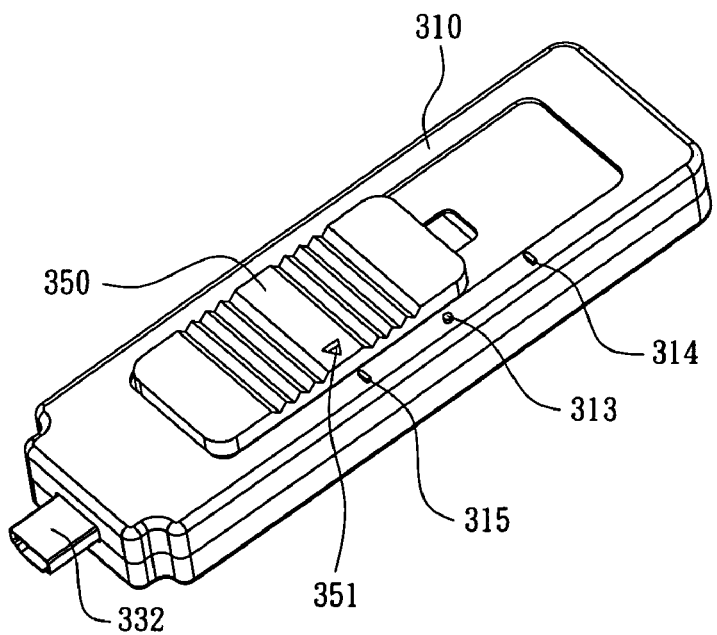

FIGS. 4A-4C are schematic 3-D views showing the assembled portable storage device. As shown in FIG. 4A, the first data interface 331 and the second data interface 332 are all stored inside the casing 310 when not in use, in which the center point 351 of the movement unit 350 is aligned with the positioning point 313. As shown in FIG. 4B, when the first data interface 331 is to be used, the movement unit 350 is pushed to move the center point 351 into alignment with the positioning point 314. At this time, the first data interface 331 also slides out of the casing 310, so that the user can use the first data interface 331 to connect the portable storage device to the electronic device for performing data exchange. Similarly, such as shown in FIG. 4C, when the second data interface 332 is to be used, the movement unit 350 is pushed in the opposite direction to move the center point 351 into alignment with the positioning point 315, thereby pushing the second data interface 332 out of the casing 310.

Figure 5A:
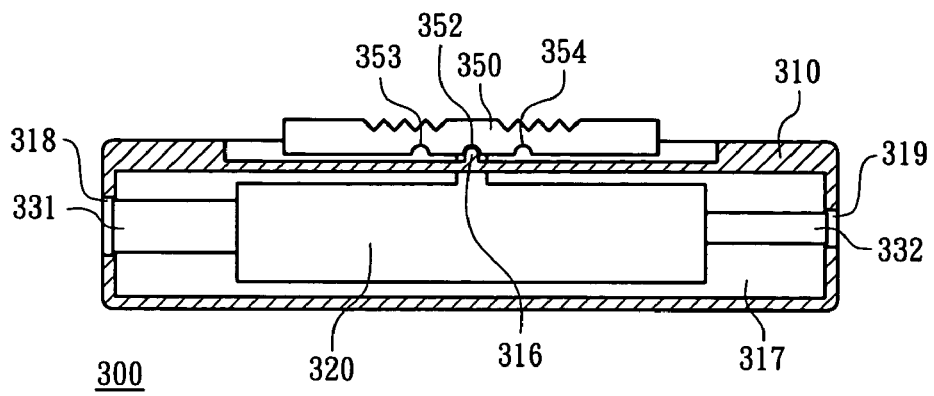
FIGS. 5A-5C are schematic diagrams respectively showing cross-sectional views according to the second preferred embodiment of the present invention.
Figure 5B:
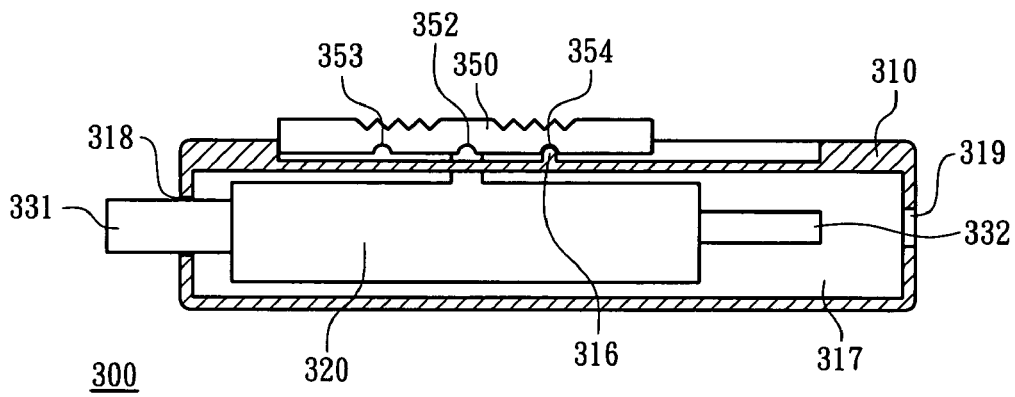
Figure 5C:
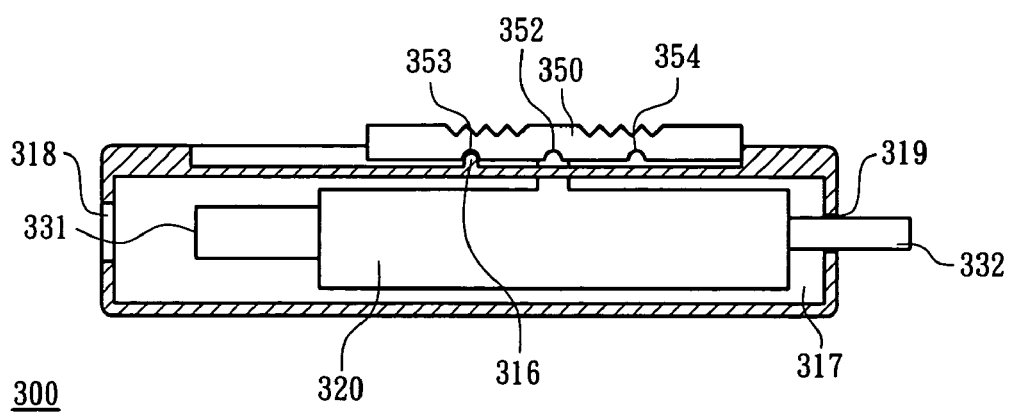

FIGS. 5A-5C are schematic, cross-sectional views showing the internal structure of the portable storage device 300. As shown in FIG. 5A, the movement unit 350 is connected to the circuit board 320, and pits 352, 353 and 354 are formed therein. The movement unit 350 slides back and forth along an axis formed between the first opening 318 and the second opening 319, thereby pushing the first data interface 331 or the second data interface 332 to move. The first data interface 331 and the second data interface 332 both are stored inside the casing 310 while not in use. The pit 352 is engaged with a projection 316 of the casing 310 so as to prevent the circuit board 320 from sliding, and thus the first data interface 331 and the second data interface 332 both can be hidden inside the casing 310.

As shown in FIG. 5B, when the first data interface 331 is to be used, the movement unit 350 is pushed to move towards the first opening 318 so as to make the first data interface 331 protrude out of the casing 310 via the first opening 318. When the pit 354 is engaged with the projection 316, the circuit board 320 is anchored in the state as shown in FIG. 5B, thereby preventing the circuit board 320 from sliding when in use. Similarly, such as shown in FIG. 5C, when the second data interface 332 is to be used, the movement unit 350 is pushed to move towards the second opening 319 so as to make the second data interface 332 protrude out of the casing 310 via the second opening 319, where the pit 353 is engaged with the projection 316.

Figure 6A:
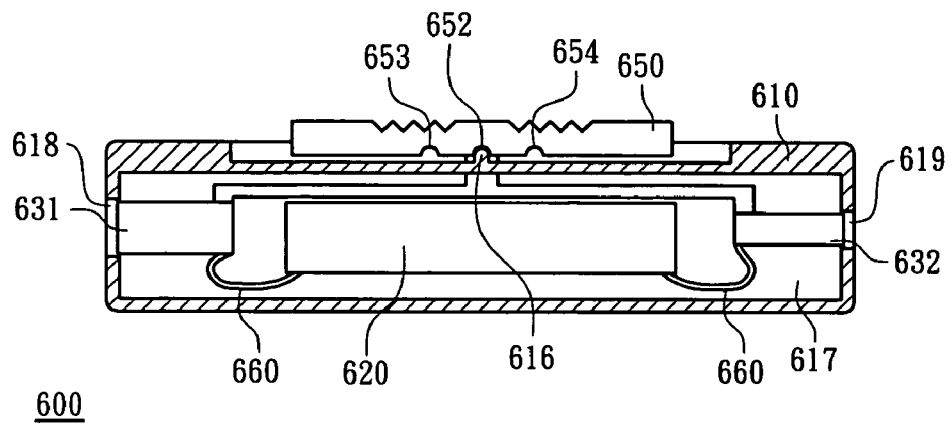
FIGS. 6A-6C are schematic diagrams respectively showing cross-sectional views according to a third preferred embodiment of the present invention.
Figure 6B:
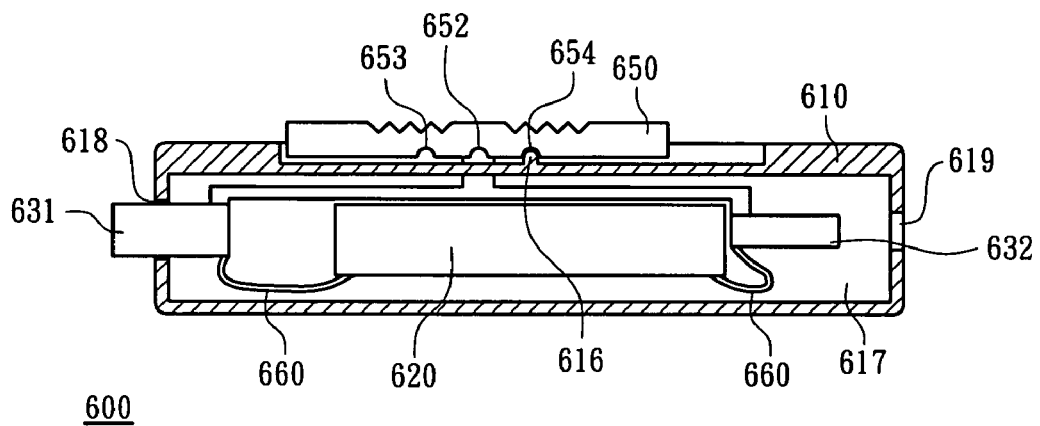
Figure 6C:
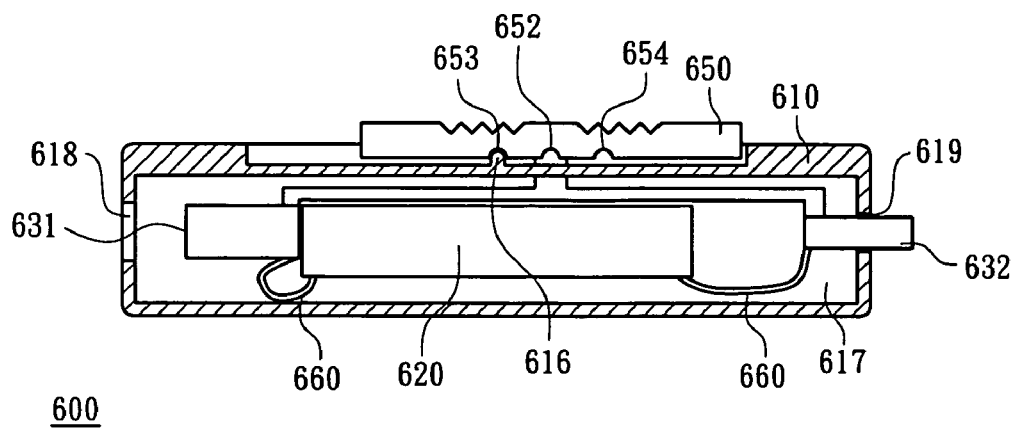

FIGS. 6A-6C are schematic diagrams according to a third preferred embodiment of the present invention. Besides being connected to the circuit board, the movement unit also can be directly connected to the first data interface and the second data interface. When in use, only the movement unit needs to be pushed to move the first data interface or the second data interface, and the circuit board does not need to be moved at the same time. The first data interface and the second data interface are connected to the circuit board by flexible printed circuit (FPC) boards to increase the convenience of use.

Such as shown in the cross-sectional view of the portable storage device 600 depicted in FIG. 6A, the first data interface 631 and the second data interface 632 are respectively connected to the circuit board 620 by flexible printed circuit boards 660. A movement unit 650 is respectively connected to the first data interface 631 and the second data interface 632, and is not connected to the circuit board 620. The movement unit 650 contains pits 652, 653 and 654 therein. While not in use, as shown in FIG. 6A, the pit 652 is engaged with a projection 616 of the casing 610 to fix the first data interface 631 and the second data interface 632, so that both of them are located inside a cavity 617 of the casing 610.

As shown in FIG. 6B, when the first data interface 631 is to be used, the movement unit 650 is pushed to move towards the first opening 618. The movement unit 650 pushes the first data interface 631 forwards to protrude out of the casing 610 via the first opening 618. Because the first data interface 631 is connected to the circuit board 620 by the flexible printed circuit boards 660, only the first data interface 631 needs to be pushed to achieve the objective of protruding the first data interface 631 out of the casing 610 without pushing the circuit board 620. Similarly, as shown in FIG. 6C, if the second data interface 632 is to be used, only the movement unit 632 is pushed to move the second data interface 632 to protrude out of the casing 610 via the second opening 619.

Therefore, with the application of the portable storage device with multiple data interfaces disclosed in the present invention, a user can choose a proper data interface to connect the portable storage device to the electronic device for directly performing data access with the electronic device without using an additional adapter. Besides, the portable storage device disclosed in the present invention is equipped with a movement unit, so that the user can choose a desired data interface for use by pushing the movement unit, thus increasing the convenience in use and further protecting the data interface from being damaged by an external force.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A portable storage device with multiple data interfaces coupled to an electronic device for performing data access, said portable storage device comprising:
    a casing, wherein said casing contains a cavity, and a first opening and a second opening are located in both sides of said casing;
    a circuit board, wherein said circuit board is placed in said cavity and contains a memory device used for performing data access;
    a first data interface, wherein one terminal of said first data interface is electrically connected to said circuit board and the other terminal of said first data interface is coupled to said electronic device for performing data access;
    a second data interface, wherein one terminal of said second data interface is electrically connected to said circuit board and the other terminal of said second data interface is coupled to said electronic device for performing data access; and
    a movement unit, wherein said movement unit reciprocates to slide on an outer surface of said casing along an axis formed between said first opening and said second opening to make said first data interface protrude out of said casing via said first opening or to make said second data interface protrude out of said casing via said second opening, wherein said first data interface and said second data interface are all stored inside said casing simultaneously in one operation state.

2. The portable storage device of claim 1, wherein said movement unit is connected to said circuit board.

3. The portable storage device of claim 2, wherein said first data interface and said second data interface are electrically connected to said circuit board by flexible printed circuit (FPC) boards.

4. The portable storage device of claim 1, wherein said movement unit is connected to said first data interface and said second data interface.

5. The portable storage device of claim 1, wherein said portable storage device is a mobile flash memory.

6. The portable storage device of claim 1, wherein said portable storage device is a storage device with MP3 function.

7. The portable storage device of claim 1, wherein said first data interface or said second data interface is a universal serial bus interface.

8. The portable storage device of claim 1, wherein said first data interface or said second data interface is a mini universal serial bus interface.

9. The portable storage device of claim 1, wherein said first data interface or said second data interface is an IEEE 1394 interface.

10. The portable storage device of claim 1, wherein said first data interface or said second data interface is a PCMCIA interface.

* * * * *